US005801690A

United States Patent [19]
Ayoub et al.

[11] Patent Number: 5,801,690
[45] Date of Patent: Sep. 1, 1998

[54] METHOD FOR MANAGING TERMINATION OF A MULTI-PROCESSING SOFTWARE APPLICATION

[75] Inventors: Ramy P. Ayoub, Arlington Heights; Arthur L. Fumarolo, Schaumburg; John William Maher, Woodstock, all of Ill.

[73] Assignee: Motorola, Inc., Schaumburg, Ill.

[21] Appl. No.: 772,238

[22] Filed: Dec. 23, 1996

Related U.S. Application Data

[63] Continuation of Ser. No. 427,513, Mar. 24, 1995, abandoned.
[51] Int. Cl.$^6$ ........................................ G06F 3/00
[52] U.S. Cl. .................... 345/329; 395/676; 395/181
[58] Field of Search ........................ 395/672, 676, 395/181, 182.22, 678; 345/329, 335

[56] References Cited

U.S. PATENT DOCUMENTS

| | | | |
|---|---|---|---|
| 4,742,511 | 5/1988 | Johnson | 370/406 |
| 4,926,495 | 5/1990 | Comroe et al. | 455/508 |
| 4,961,070 | 10/1990 | Maher et al. | 345/342 |
| 5,093,913 | 3/1992 | Bishop et al. | 711/152 |
| 5,175,866 | 12/1992 | Childress et al. | 455/8 |
| 5,200,954 | 4/1993 | Teel, Jr. et al. | 370/338 |
| 5,274,838 | 12/1993 | Childress et al. | 455/9 |
| 5,276,442 | 1/1994 | Cree et al. | 340/825.52 |
| 5,305,467 | 4/1994 | Herndon et al. | 455/514 |
| 5,404,520 | 4/1995 | Sonobe | 395/671 |
| 5,469,542 | 11/1995 | Foster et al. | 395/200.54 |
| 5,594,901 | 1/1997 | Andoh | 395/674 |
| 5,675,796 | 10/1997 | Hodges et al. | 395/670 |

OTHER PUBLICATIONS

Youngsik, B. et al, "Software abort and Multiprocessor Debugging," IEEE Tencon '93, Bejing, pp. 237–251, 1993.
Peng, "Bounds of Start and Completion Times of Application Tasks on the RTEM System", IEEE, pp. 54–58, 1993.
Yamada et al., "Fault Tolerant Multiprocessor for Digital Switching Systems", IEEE, pp. 245–252, 1989.
Graf, "Modern Dictionary of Electronics", Howard W. Sams, p. 265, 1977.

*Primary Examiner*—A. Katbab
*Attorney, Agent, or Firm*—Andrew S. Fuller

[57] ABSTRACT

A computer system (110) has a multi-processing software application operating (200) thereon. There are multiple client processes (221–228) concurrently operating as components of the multi-processing software application (200). Termination of the multi-processing software application (200) results from individual decisions made at each client process (221–228). If a particular client process determines that another client process is inoperable (530), the particular client process continues operation when the inoperable process is designated non-mandatory (550, 510), and terminates operation when the inoperable process is designated mandatory (550, 580, 598). Furthermore, when the inoperable process is designated single-instance mandatory and belongs to a particular process class, the particular client process continues operation unless it is the only member of the process class operating (580, 590, 595, 598). As each client process operates using this termination procedure, the ultimate effect is on the multi-processing software application itself.

12 Claims, 5 Drawing Sheets

METHOD FOR MANAGING TERMINATION OF A MULTI-PROCESSING SOFTWARE APPLICATION

This is a continuation of application Ser. No. 08/427,513, filed Mar. 24, 1995, and now abandoned.

CROSS REFERENCE TO RELATED APPLICATIONS

This application is related to pending U.S. patent applications, Ser. No. 08/427,025, now U.S. Pat. No. 5,710, 924 filed concurrently herewith, entitled METHOD OF ROUTING MESSAGES WITHIN A MULTIPROCESSING SOFTWARE SYSTEM, and Ser. No. 08/427,514 entitled METHOD OF PROVIDING DISTRIBUTED OPERATIONAL CONTROL OF A RADIO COMMUNICATION SYSTEM and assigned to Motorola, Inc.

TECHNICAL FIELD

This invention relates in general to the operation of a software application in a multi-processing environment, and more particularly, to the termination of a multi-processing software application.

BACKGROUND OF THE INVENTION

Many software applications operate in a multi-processing environment and comprise several executable processes (herein "client processes"). The client processes communicate with each other and otherwise interact to perform requisite functions. As is well known, client processes sometimes abnormally terminate for exceptions caused by program errors, operating system errors, operator action, equipment malfunction, among others. An abnormally terminated process can create havoc for the overall operation of the software application, as this process may be providing essential services for other processes. Moreover, an operator may be unaware of the termination, and the performance of important functions may be affected.

One prior art approach to this problem involves the use of a monitor process that keeps track of the execution status of each client process, and that responds to the termination of a process with some appropriate action. A problem exists when the monitor process itself is not operating properly and is unable to perform this task. An application may be operating improperly without warning. For critical applications, the correct handling of exception conditions is paramount. The prior art does not adequately address this problem. Therefore, a new approach to the management of terminating processes in a multi-processing application is needed.

DETAILED DESCRIPTION OF THE PREFERRED EMBODIMENT

Figure 1:
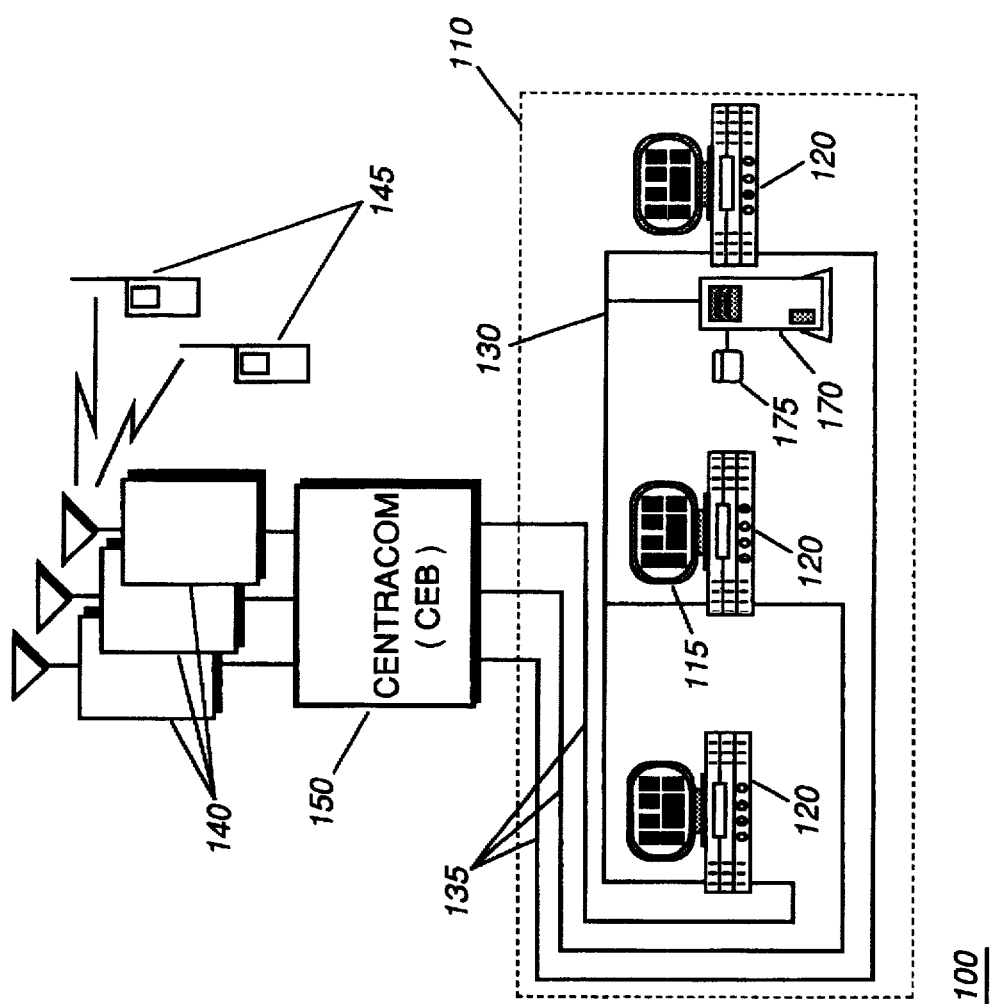
FIG. 1 shows a radio communication system with an operational control interface, in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention provides for management of the termination of operation of a multi-process software application operating on a computer system. In the preferred embodiment, the multi-process software application provides support for operator assisted operational control of a radio communication system. When the multi-process software application is invoked, several executable client processes are ordinarily activated. According to the present invention, each executable client process is classified based on the effect that termination of that process, whether intentionally or unintentionally, has on the operability of the multi-process software application. In the preferred embodiment, the possible termination classifications, or designations, are non-mandatory, mandatory, and single-instance mandatory. When a particular client process terminates, or is otherwise not executing in a normal execution mode, the other client processes of the multi-process software application are notified. Each client process, upon determining that the particular client process is not operating properly or has terminated, bases its response on the termination designation of the particular client process. If the particular client process is of a designated non-mandatory classification, the instant process continues operation. When the particular process is of a designated mandatory classification, the instant process terminates its operation. When the particular process is of a designated single-instance mandatory classification, and belongs to a particular class, and there are no other client processes of the particular class operating in a normal execution mode, the instant client process terminates. The termination of non-mandatory, and in some cases, single-instance mandatory client processes, may result in the multi-process software application operating in a reduced-functionality mode. Termination of mandatory client processes, and single-instance mandatory client processes when there are no other processes belonging to the class that are operating, causes the termination of the multi-process software application. Termination decisions in response to a client process not operating normally are independently made by each normally executing client process.

Referring to FIG. 1, a block diagram of a radio communication system 100 is shown, in accordance with the present invention. The communication system 100 includes wireless transceivers 140, or base stations, which are linked through a communication system interface 150 and connected to a communication network 130, and a computer system 110. The transceivers 140 interface with remotely situated wireless communication devices 145, such as portable or mobile two-way radios. The communication system interface 150 is a CENTRACOM Central Electronics Bank (CEB), available from Motorola, Inc. The communication system interface 150 interconnects the wireless transceivers 140 to the computer system 110 through a serial link interface 135, also referred to herein as a hardware link.

The computer system 110 supports operational control of the radio communication system 100, or a portion thereof. The computer system 110 has multiple console workstations 120, each providing an operator interface to the radio communication system. The computer system also includes a database server 170, accessible by each console workstation, that provides centralized access to a resource configuration database 175 for the radio communication system (herein "radio communication database"). Software processes running on the console workstations interface with the database server to access the radio communication database 175. In the preferred embodiment, the console workstations 120 are personal computer (PC) class computing devices, utilizing a multi-tasking operating system, such as the Microsoft® Windows NT operating system, and connected via a local area network. However, the present invention is not limited to a specific computing device, operating system, or computer network.

Each console workstation 120 has output devices, such as display unit 115, and input devices (not shown) to support an operator control interface to the radio communication system 100. An operator interacts with the operator control interface via the display unit 115, and via one or more input devices, such as a keyboard, and a mouse or other pointing device.

Figure 2:
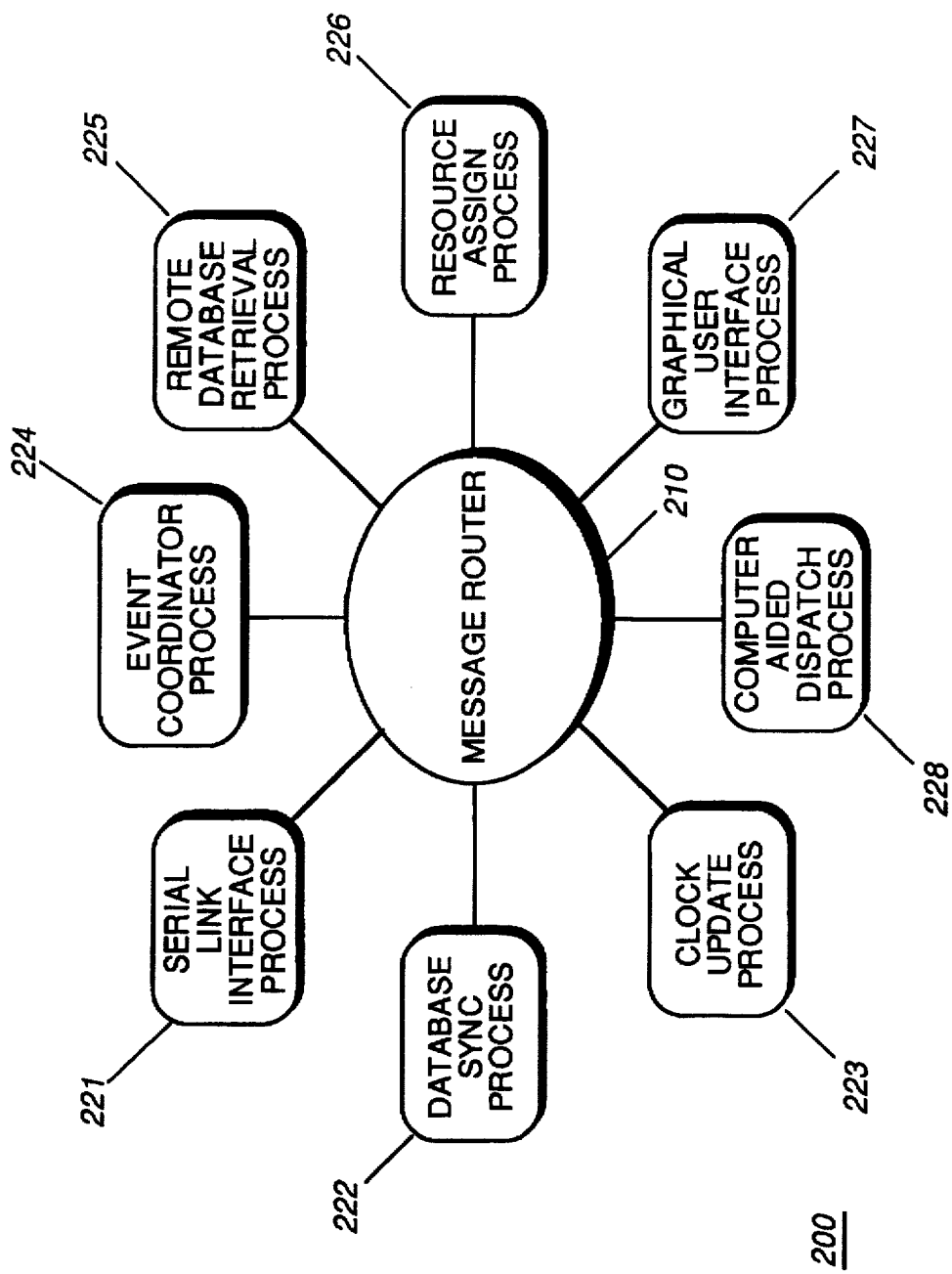
FIG. 2 is a block diagram of a multi-processing radio console software application, in accordance with the present invention.

FIG. 2 is a high level block diagram of the software architecture of a multi-process console software system 200, as executed on the console workstation 120, in accordance with the present invention. Referring to FIGS. 1 and 2, the operator control interface 200 comprises processes 210, 221–228 that execute on the console workstation as part of a multi-process software application (hereinafter "console software system"). The console software system supports operator assisted operational control of the radio communication system. Selected client processes 210, 221–228 of the console software system communicate with each other, and some of these processes perform functions essential or important to the overall operation the console software system. When one or more of the client processes terminate, the console software system may need to terminate, or operate in a reduced-functionality mode. For example, an operator may be handling an emergency situation, at the time of the process termination, and it is imperative that the console software system provide, at least, the most basic functionality under these conditions, if possible. In other situations, the termination of a process may impact that console's functionality to the extent that the operator may not continue, and thus the console software system must be forced to shut down. The present invention provides for independent assessment of these conditions by each process of the console software system, and the performance of the appropriate termination decision.

The console software system includes, among other processes, a message router 210, a serial link interface process 221, a database synchronization process 222, a clock update process 223, an event coordinator process 224, a remote database retrieval process 225, a resource assign process 226, a graphical user interface (GUI) process 227, and a computer aided dispatch process 228. The message router process 210 serves as a communication server for other processes 221–228 of the console application. The message router 210 is responsible for correctly routing a particular message to all processes that require the particular message. The processes 221–228 connect to the message router 210 via message queues in a manner well known in the art. The serial link interface process 221 retrieves and sends information between a console workstation and the communication system interface 150. The remote database retrieval process 225 retrieves system configuration information from the database server 170. The database synchronization process 222 synchronizes information in a local database on the console workstation 120 with information stored within the communication system interface 150. The event coordinator process 224 coordinates the remote database retrieval process 225 with the database synchronization process 222. The event coordinator process 224 also gathers fault maintenance information from the other client processes in the system, and determines whether the console operator may dispatch, based on this fault maintenance information. If the event coordinator 224 determines that dispatching by the operator should not proceed, then the operator will be notified of this condition. The clock process 223 is responsible for monitoring the clock information coming from the communication system interface 150, and updating the console workstation 120 clock accordingly, thereby synchronizing the time on the various console workstations 120. The graphical user interface process 227 provides the operator interface to the system. The computer aided dispatch process 228 provides an interface which allows external control of the console system.

When the console software system is initiated, each process 221–228 registers with the message router 210, as a member of a pre-determined process class. As a particular process registers, it is assigned a unique process identifier (PID) by the message router 210. The message router 210 then notifies all other previously registered client processes of the class and PID of the newly registered client process. One or more of the client processes described above may belong to the same process class. In the preferred embodiment, process classes are assigned by the developers of the process based on the type of information required by the process to perform its function, or based on the function performed. For example, processes providing user interface functions, such as the GUI process 227, are assigned to the Dispatch User Interface (DUI) class. Members of the same class may, or may not, perform the same type of function.

Figure 3:
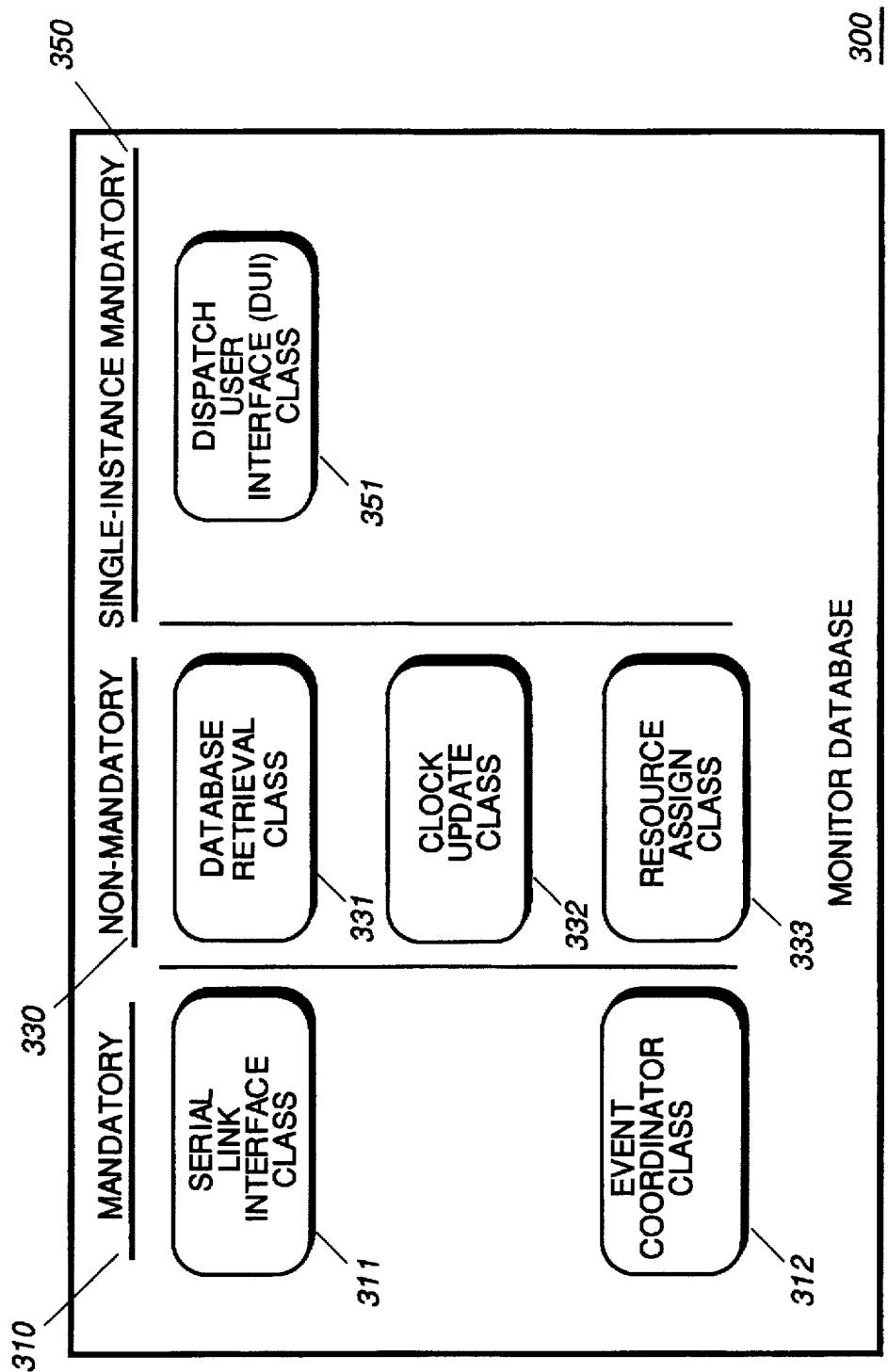
FIG. 3 is a database representation of the termination designations of the client process classes.

FIG. 3 is a block diagram representing a database 300 (hereinafter "monitor database") of termination designations of the processes. Referring to FIGS. 2 and 3, processes are classified according to function and/or information needed to function. For example, the serial link interface process 221 is a member of a serial link interface class 311; the event coordinator process 224 is a member of a event coordinator class 312; the remote database retrieval process 225 and the database synchronization process 222 are both members of a database retrieval class 331; the graphical user interface process 227 and the computer aided dispatch process 228 are both members of a dispatch user interface class 351. Other processes are likewise classified. The processes concurrently operate as components of the console software system.

The process classifications are used to assign termination designations based on the impact that termination of a process, having the classification, has on the console software system. A mandatory termination designation 310 is assigned to processes of the serial link interface class 311, and the event coordinator class 312. A non-mandatory designation 330 is assigned to processes of the database retrieval class 331, the clock update class 332, and the resource assign class 333. A single-instance mandatory designation 350 is assigned to processes of the dispatch user interface class 351. Process classes 311, 312 having the mandatory designation 310 are considered essential for the operation of the console software system. The termination of any process belonging to these classes 311, 312 would impair the functionality of the console software system to an extent that would render the even the most basic functions of the application completely useless to the operator.

Process classes having a non-mandatory designation 330 are considered important for the complete functionality of the console software system, but are not considered mandatory for basic operation. The termination of any process having this designation may place the console software system in reduced functionality mode, but does not render the system inoperable. This is important, since if any of these processes terminated during an emergency situation, an operator may be still provided with basic transmit and receive functionality required to handle the emergency situation. The operator will, however, be notified of the termination, should the operator attempt to access functionality provided by the terminated process. The single-instance mandatory designation 350 is useful for a particular class whose processes provide similar, if not, identical functionality for console software system operation, but only one process of the particular classes is required for the most basic functionality of the console software system.

Figure 4:
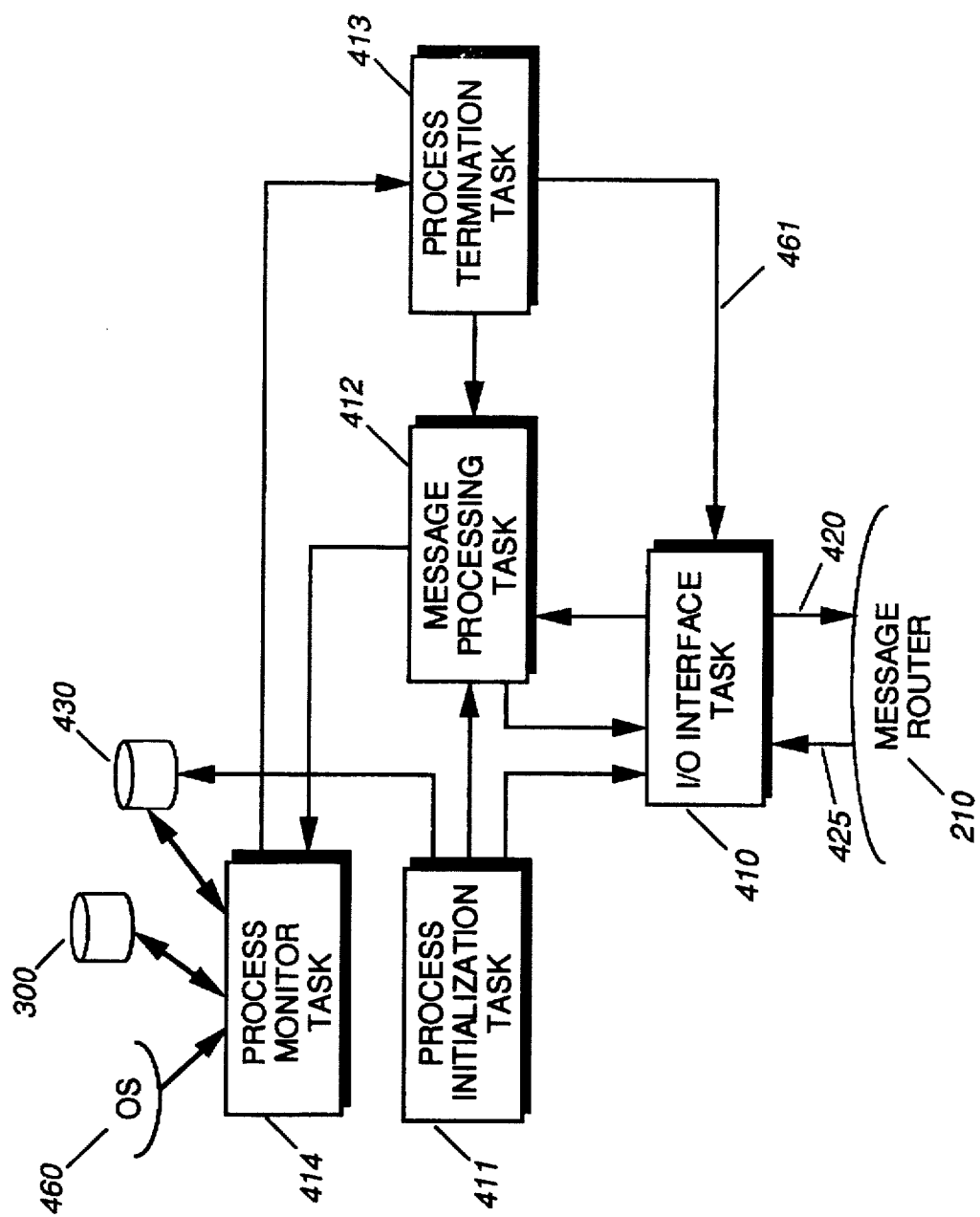
FIG. 4 is a block diagram showing major components of a client process of the multi-processing radio console software application of FIG. 2, in accordance with the present invention.

FIG. 4 shows a typical software architecture for a simplified client process, in accordance with the present invention. Referring to FIGS. 2, 3, and 4, executable software modules or tasks 410, 411, 412, 413, 414, perform various functions within a process. The tasks include an input/output (I/O) interface task 410, a process initialization task 411, a message processing task 412, a process termination task 413, and a process monitor task 414, all interacting to form a functional block. The I/O interface task 410 assigns message types to outbound messages 420, based on the information contained in the message, and forwards the message to the message router 210. The I/O interface task 410 also receives messages 425 from the message router 210, and forwards the messages to the message processing task 412. The message processing task 412 processes the received messages to fulfill the requirements of the instant client process. The process initialization task 411 initializes process specific variables, and registers the process with the message router. The process initialization task 411 also updates a process identification database 430 with information on client processes known to be operating and which will be monitored for execution status.

Each client process also contains a monitor task 414. The monitor task 414 monitors the execution status of other registered client processes comprising the console software system. As each client process registers, the registration is broadcast, by the message router 210, to all the other client processes. The monitor task 414, within each previously registered client process, updates the process identification database 430 with the class information and the process identification information of the process. The monitor task 414 then proceeds to monitor the execution status of all the processes identified in the process identification database 430 to determine whether these processes are executing in a normal execution mode. The monitor task 414 accesses the monitor database 300 which contains the termination designation of each process class. The monitor task 414 retrieves the termination designation of terminated processes from this database, when it detects a termination.

The process termination task 413 is responsible for terminating, or shutting down, the instant process. This includes de-allocating memory, closing resource handles, as well as de-registering the client from the console software system, by sending a de-registration message 461, via the I/O interface task 410, to the message router 210. The message router 210 broadcasts this message 461 to other client processes. A client process may terminate if the current operating environment of the console workstation does not allow the process to perform its normal operations. For example, the serial link handler process 221 may terminate if it is unable to open a serial communications port of the workstation. The monitor tasks residing on all the other client processes will be notified of the termination through the de-registration message 461. Processes may also terminate for other, less predictable, reasons. A fault in the software of a process may cause an exception that will cause the process to terminate without invoking its termination task. In these cases, the operating system 460 of the console workstation will notify the monitor task 414 residing on all existing client processes of the termination, through methods well known in the art.

Figure 5:
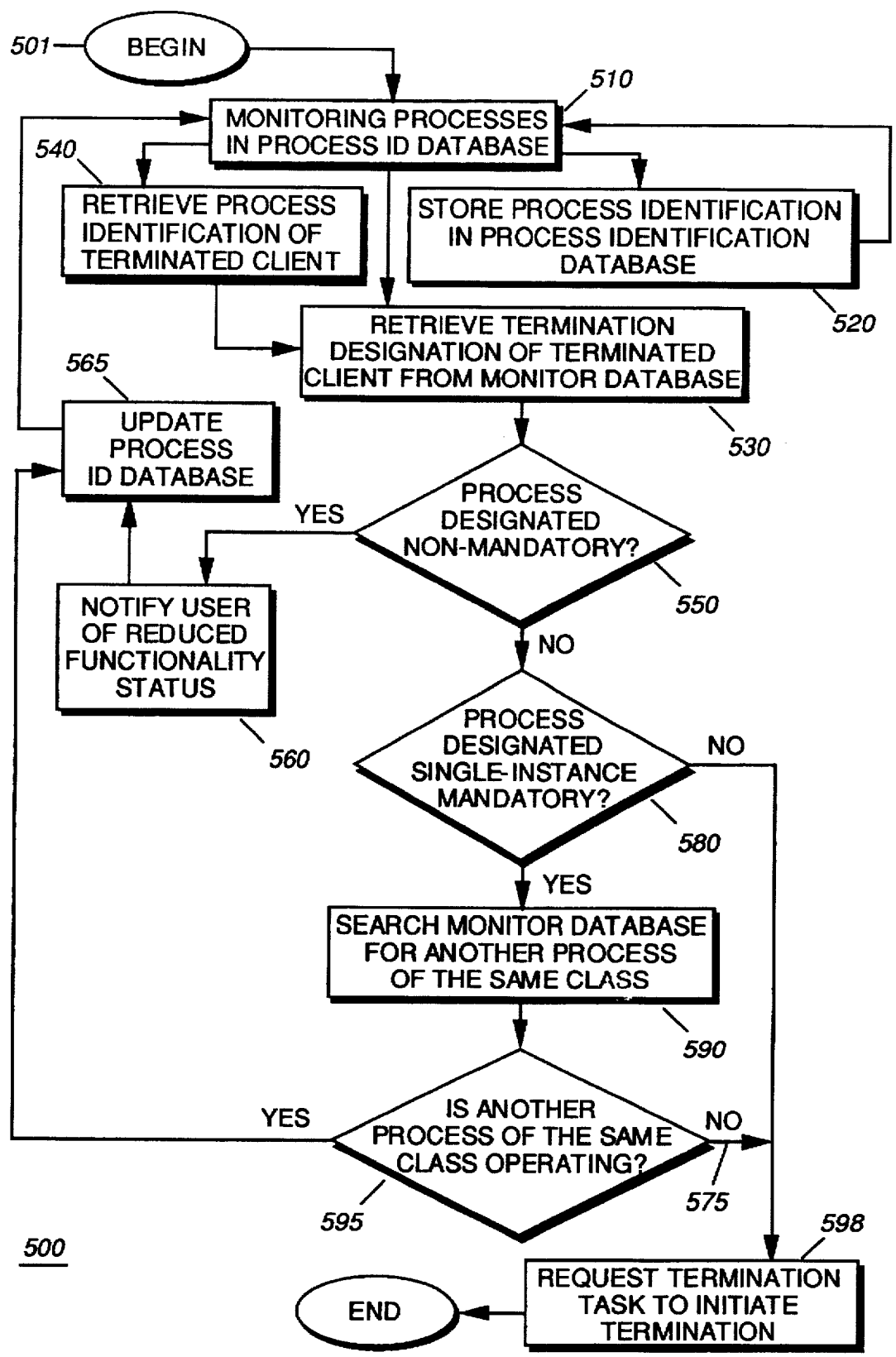
FIG. 5 is a flow chart of procedures to manage client process termination, in accordance with the present invention.

FIG. 5 is a flowchart of procedures 500 used in managing termination of a client process, in accordance with the present invention. Referring to FIGS. 2–5, at step 501, the process begins and the monitor task 414 initiates the monitoring of all the client processes in the process identification database 430, step 510. The monitor task receives process identification and other registration information from other processes, and stores this information in the process identification database, step 520. The client process determines, through the monitor task, that a particular client process, selected from the client processes of the console software system, is not operating in normal execution mode (inoperable), such as by having terminated. For example, the monitor task may receive a de-registration message from the message router 210, because of the termination of the particular client process. Alternatively, the monitor task 414 may be notified by the operating system that the particular process has terminated or is not operating in a normal execution mode. In this case, the monitor task must first translate the information from the operating system to identify the process by accessing the process identification database, step 540.

Next, the monitor task retrieves, from the monitor database, the termination designation for the class to which the particular process belongs, step 530. When the particular client process is a designated non-mandatory client process, step 550, the instant process continues operation. Since each executing process is making this evaluation, the result is that the console software system continues operation. Preferably, the monitor task 414 generates an operator notification message indicating a reduced-functionality mode caused by the termination or abnormal execution of the particular process. The monitor task 414 also removes the de-registering client process from the process identification database, step 565. The monitor task 414 then monitors the remaining tasks in the process identification database 500.

When the particular process does not have a non-mandatory designation, 550, the monitor task 414 determines whether the particular process has a single-instance mandatory or a mandatory designation, step 580. If the particular process has a single-instance mandatory designation, the monitor task searches the process identification database for another process having the same class as the particular process, step 590, i.e., there is at least one other client process of the particular class that is operating in normal execution mode. If found, the instant process continues operation. Since each executing process is making this evaluation, the result is that the console software system continues operation. The monitor task updates the process identification database, step 565, and continues monitoring the processes in the process identification database, step 510. If a process of the same class is not found 575, i.e., there are no other client processes of the particular class that is operating in normal execution mode, the monitor task requests the termination task to initiate the termination of the process, step 598. Similarly, if the particular process has a mandatory designation, the instant process terminates. As each executing process is making the termination evaluation, the result is that the console software system terminates operation.

The present invention provides significant advantages. Certain multi-processing software applications, such as the console software for a radio communication system of the preferred embodiment, provide important services, and proper management of execution status is essential. By independent assessment of the execution status of other processes within the application, a process, according to the present invention, determines whether to continue operation in response to the termination or abnormal execution of another process. Thus, there is a reduced potential that orphaned processes may exist on a workstation that are not properly functioning, or that may interfere with the operation of So others. This is accomplished without an overseer or parent process which may itself be subjected to abnormal termination or operation.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a computer system having a multi-processing software application operating thereon, the multi-processing software application having a plurality of client processes concurrently operating as components thereof, a method of managing termination of the multi-processing software application, the method comprising the steps of:
   at each instant client process of the plurality of client processes operating in a normal execution mode:
      determining that a particular client process, selected from among the plurality of client processes, is not operating in a normal execution mode;
      continuing operation of the instant client process when the particular client process is a designated non-mandatory client process; and
      terminating operation of the instant client process when the particular client process is a designated mandatory client process, such that the instant client process no longer executes;
   wherein collective termination of each instant client process of the plurality of client processes operating in a normal execution mode terminates operation of the multiprocessing software application.

2. The method of claim 1, further comprising the step of, at each instant client process of the plurality of client processes, terminating operation of the instant client process when the particular client process is a designated single-instance mandatory client process, and is of a particular class and there are no other client processes, of the plurality of client processes, that is of the particular class, and that is operating in a normal execution mode.

3. The method of claim 2, further comprising the step of, at each of the plurality of client processes, continuing operation of the instant client process when the particular client process is designated single-instance mandatory client process, and is of a particular class and there is at least one other client process, of the plurality of client processes, that is of the particular class, and that is operating in normal execution mode.

4. The method of claim 1, wherein the step of continuing operation comprises the step of generating, by the multi-processing software application, an operator notification message indicating a reduced-functionality mode.

5. The method of claim 1, further comprising the step of designating each of the plurality of client processes as one of a non-mandatory client process, a mandatory client process, and a single-instance mandatory client process, based on impact of the particular client process on the multi-processing software application.

6. The method of claim 5, wherein the step of determining, comprises the steps of:
   storing, by each of the plurality of client processes, identification information on at least some of the plurality of client processes; and
   monitoring execution status of each of the plurality of client processes based on the identification information.

7. The method of claim 1, wherein the step of continuing operation comprises the step of operating in a reduced functionality mode when the particular client process is not operating in a normal execution mode and the particular client process is a designated non-mandatory client process.

8. In a computer system having a multi-processing software application for a radio communication system console operating thereon, a method of managing termination of the multi-processing software application, the method comprising the steps of:
   concurrently executing a plurality of client processes on the computer system as components of the multi-processing radio communication system console software application;
   designating each of the plurality of client processes as one of a non-mandatory client process, a mandatory client process, and a single-instance mandatory client process, based on impact of termination on the multi-processing software application;
   at each instant client process of the plurality of client processes operating in normal execution mode:
      determining that a particular client process, selected from among the plurality of client processes, is not executing in a normal execution mode;
      continuing execution of the instant client process when one of:
         the particular client process is a designated non-mandatory client process; and
         the particular client process is designated as single instance mandatory client process and is of a particular class, and there is at least one other client process, that is of the particular class, and that is operating in a normal execution mode;
      terminating execution of the instant client process when one of:
         the particular client process is a designated mandatory client process; and
         the particular client process is a designated single-instance mandatory client process and is of a particular class and there is no other client process, from the plurality of client processes, that is of the particular class, and that is operating in a normal execution mode;
   wherein collective termination of the plurality of client processes terminates operation of the multiprocessing software operation.

9. The method of claim 8, wherein the step of continuing operation comprises the step of generating, by the multi-processing radio communication system console software application, an operator notification message indicating a reduced-functionality mode.

10. In a computer system having a multi-processing software application, the multi-processing software application having a plurality of client processes concurrently operating as components thereof, at a first client process selected from the plurality of client processes, a method of determining when to terminate, the method comprising the steps of:

monitoring an execution status for a second client process selected from among the plurality of client processes;

determining that the second client process is not executing in a normal executing mode;

continuing operation of the first client process when the second client process is a designated non-mandatory client process, such that the multi-processing software functions in a reduced functionality mode;

terminating operation of the first client process when the second client process is a designated mandatory client process, such that the first client process no longer executes;

terminating operation of the first client process when the second client process is a designated single-instance mandatory client process and is of a particular class, and there is no other single-instance mandatory client process operating that is of the particular class.

11. The method of claim 10, further comprising the step of continuing operation of the first client process when the second client process is a designated single-instance mandatory client process and is of a particular class, and there is at least one other single-instance mandatory client process operating that is of the particular class.

12. The method of claim 10, wherein the step of continuing operation comprises the step of generating, by the software application, a user notification message indicating a reduced-functionality mode.

* * * * *